Dec. 2, 1969  W. F. WATERS, JR  3,481,028
ADAPTIVE MECHANISM FOR JIG SAWS
Filed June 8, 1967  2 Sheets-Sheet 1

WILFRED F. WATERS, JR.
INVENTOR.

BY *Jack A Kanz*
ATTORNEY

Dec. 2, 1969       W. F. WATERS, JR       3,481,028
ADAPTIVE MECHANISM FOR JIG SAWS
Filed June 8, 1967       2 Sheets-Sheet 2

WILFRED F. WATERS, JR.
*INVENTOR.*
BY Jack A Kanz
ATTORNEY

United States Patent Office 3,481,028
Patented Dec. 2, 1969

3,481,028
ADAPTIVE MECHANISM FOR JIG SAWS
Wilfred F. Waters, Jr., 738 Highfall Drive,
Dallas, Tex. 75232
Filed June 8, 1967, Ser. No. 644,629
Int. Cl. B23p 23/00
U.S. Cl. 29—560
11 Claims

ABSTRACT OF THE DISCLOSURE

Disclosed are adaptive mechanisms for mounting drilling means and blade-holding means for jig saws on a single saw head to provide an apparatus having the functions of a drill press and a jig saw. Also disclosed are apparatus incorporating such adaptive mechanisms and methods of operating such apparatus.

Figure 1:
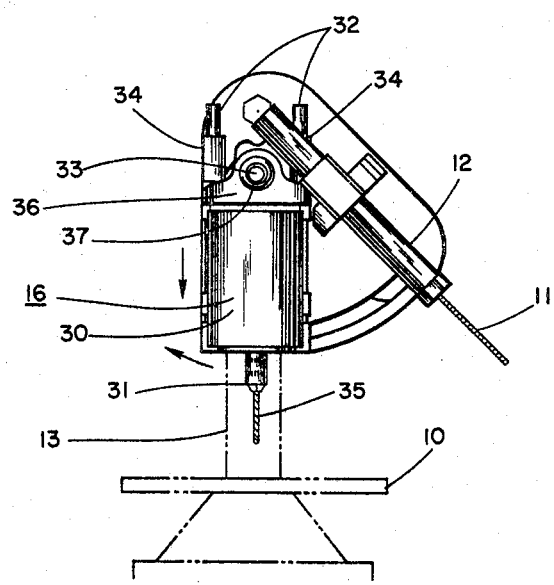

This invention relates to apparatus for integrating the functions of a drill press and a jig saw or scroll saw into a single piece of equipment. More particularly, it relates to adaptive mechanisms for integrally mounting the tension head of a scroll saw and drilling means on a single rotatable plate which rotates partially about a pivot point, and a base plate which is secured to the overarm of an ordinary jig saw or scroll saw. The base plate supports the adaptive plate at a pivot point and carries a guide stud which protrudes through a guide slot in the rotatable adapter plate for alternatively positioning the tension head or the drill shaft vertically over the work table. The terms jig saw and scroll saw are used herein to describe any of the general class of cutting machines characterized by having a thin ribbonlike blade having one end supported in a tension head and the other end engaging vibratory means for imparting reciprocal motion to the blade. The term tension head is used herein to describe blade-holding means which support one end of the blade. It is to be understood that the invention is equally applicable to jig saws using thin round blades as well as those using flat ribbonlike blades.

Jig saws or scroll saws are commonly used for sawing various materials ranging from fabrics, such as paper or leather, to hard metals. Frequently it is necessary to use such saws to cut regular or irregularly shaped portions from within a sheet or body of the work material. If the hole to be formed is not to extend to the edge of the work piece, it is necessary to form a small entry hole in the work piece such as by drilling, to form an aperture through which the saw blade may be inserted. For this purpose an ordinary drill press or hand held drill may be used.

Once the entry hole is formed in the work piece, the work piece is then transferred to a scroll saw work table, the saw blade inserted through the hole and secured at its upper end in a tension head and at its lower end in clamps or hook means extending from a mechanism below the work table which imparts reciprocal motion to the blade.

It is evident that when one or more entry holes are required in a single work piece, the work piece must be repeatedly transferred from the work table of the scroll saw to a drill press, the entry hole formed, and the work piece then returned to the work table of the scroll saw. Furthermore, since the work piece is repeatedly transferred from the work table of one machine to the work table of a second machine, the entry hole must be manually aligned in registry with the saw blade. Repeatedly transferring the work piece between two separate machines is obviously time consuming and inconvenient. Although several entry holes may be formed in a single work piece prior to transferring the work piece to the saw, manual alignment will still be required for each time the blade is withdrawn from the work piece, and the blade must be completely removed from the machine each time the blade is withdrawn.

Briefly, in accordance with the present invention, an adaptive mechanism is interposed between the overarm of the scroll saw and the tension head of the scroll saw. The adaptive mechanism comprises a pair of adapter plates, one of which is secured to the overarm of the scroll saw in place of the scroll saw tension head. The second adapter plate is pivotally mounted on the first plate and may be partially rotated in the vertical plane about the pivot point. The scroll saw tension head is then remounted on the second plate. Also mounted on the second plate is a drill.

The second plate has guide and indexing means for alternatively locking either the scroll saw tension head or the drill in a vertical position above the work piece. The base plate, which is secured to the overarm, is provided with a vertical pivot slot to allow the entire second plate to be raised vertically, thus allowing the saw blade to be fully withdrawn from the work piece without removing the blade from the tension head. Furthermore, the adapter base plate may be designed to attach to the overarm of the saw using the same mounting holes and the like which originally mounted the tension head.

In operation, the second adapter plate is rotated in the vertical plane to align the drill shaft vertically above the work piece. The drill motor is lowered along a slideable carriage and an entry hole formed in the work piece at the desired location. The drill motor is then withdrawn, the adapter plate rotated to position the drill motor away from the entry hole formed and simultaneously align the scroll saw tension head and saw blade vertically above and in registry with the entry hole formed. The lower end of the saw blade, extending from the tension head, is then inserted through the entry hole and attached to the reciprocating mechanism below the table. The operator may then proceed directly to saw the desired hole in the work piece without moving the work piece from the work table of the scroll saw.

It can be readily seen that by integrating a drilling means with the scroll saw, entry holes may be formed in the work piece without transferring the work piece between two or more different machines. A further advantage of the invention is that the entry hole formed in the work piece is automatically in registry with the index hole in the work table and the tension head of the scroll saw, thus eliminating manual alignment. Furthermore, since the tension head may be moved vertically while the blade is in registry with the entry hole and index hole, the saw blade need never be removed from the tension head. Accordingly, vast savings in time are realized.

A unique feature of the invention is the integration of means for forming an entry hole in a work piece in combination with a scroll saw. In accordance with this invention, adaptive mechanisms may be readily integrated with virtually any commercially available scroll saw to obtain the advantages of this invention.

It is therefore an object of this invention to produce a scroll saw with an integrally mounted drilling means for forming entry holes in the work piece. Another object is to provide adaptive means for converting commercially available scroll saws to obtain the advantages of the invention. A further object is to provide an apparatus which substantially reduces the operation time required for repetitive sawing operation performed on scroll saws.

Figure 2:
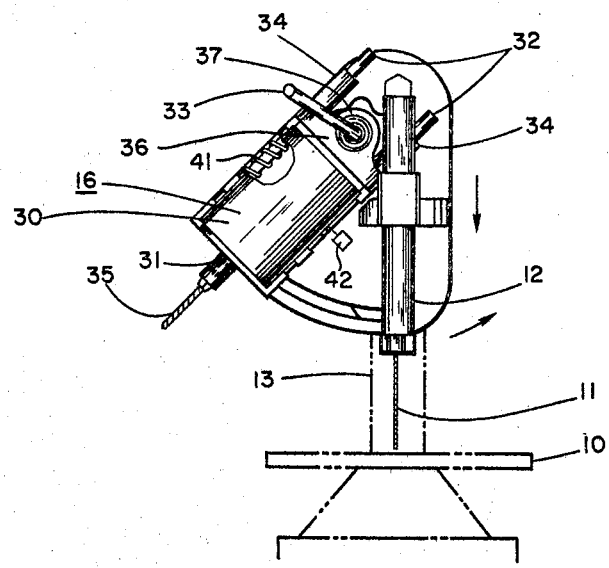
Figure 3:
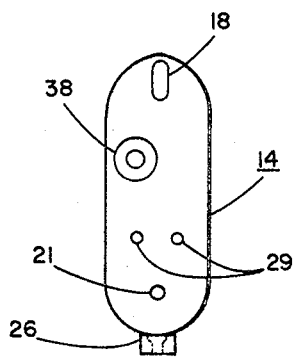
Figure 4:
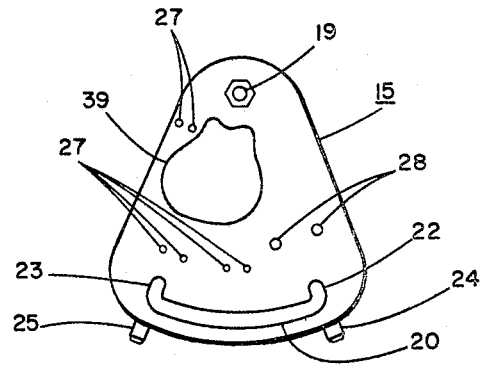
Figure 5:
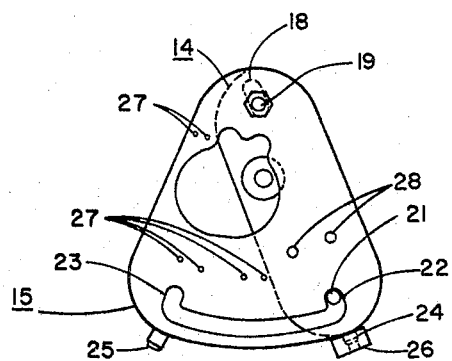

Other objects, features and advantages will become more readily understood from the following detailed description taken in connection with the appended claims and attached drawings in which:

FIGURE 1 is a front view of a scroll saw fitted with the adaptive mechanism of the invention showing the drill mechanism in position for use, FIGURE 2 is a front view of a scroll saw fitted with the adaptive mechanism of the invention showing the tension head in position for use, FIGURE 3 is a front view of the adapter base plate of the invention, FIGURE 4 is a front view of the rotatable adapter plate of the invention, and FIGURE 5 is a front view of the adaptive mechanism of the invention incorporating the adapter plates of FIGURES 3 and 4.

Referring specifically to FIGURES 1 and 2, there is shown a conventional jig saw comprising a work table 10 horizontally disposed for carrying the work piece in conventional jig saws or scroll saws. A mechanism (not shown) is disposed beneath the work table to which one end of the saw blade may be attached. The saw blade 11 passes vertically through an aperture in the work table and has its upper end attached to the tension head 12. The basic function of the tension head is to hold the saw blade in a vertical position while maintaining tension on the saw blade. In a conventional scroll saw the tension head is permanently secured to the overarm 13 in a fixed position in registry with the index hole in the work table.

In accordance with the invention, adaptive plates, the preferred embodiment of which are shown in detail in FIGURES 3, 4, and 5, are interposed between the overarm 13 of the saw and the tension head 12. One plate is rigidly fixed to the overarm and the second plate pivots in the direction shown by the arrows in FIGURES 1 and 2. The tension head 12 is mounted on the rotatable adapter plate 15. Also mounted on the adapter plate is a drilling mechanism generally indicated at 16 in FIGURES 1 and 2.

The preferred embodiment of the adaptive mechanism is illustrated in FIGURES 3, 4, and 5. The adaptive mechanism is comprised of two plates generally indicated by the numerals 14 and 15. The adapter base plate 14 is rigidly mounted to the overarm of the scroll saw and carries a guide stud 21 extending from the face thereof. At the upper end of the adapter base plate is a vertically arranged pivot slot 18.

The rotating adapter plate 15 carries a pivot stud 19 mounted at its upper end and extending from the back thereof through the pivot slot 18 of the adapter base plate 14 as shown in FIGURE 5. The pivot stud 19 fits in slot 18 and provides guide means for vertical motion of the rotating plate 15. Plate 15 also has a guide slot 20 at the lower end thereof which is substantially U-shaped. The base of the U-shaped guide slot 20 extends over an arc of fixed radius from pivot stud 19. At each end of the guide slot 20 are upwardly extending slot arms 22 and 23. Each of the arms 22 and 23 extend along the radius line extending from the pivot stud 19. Arms 22 and 23 extend upwardly and are substantially the same length as pivot slot 18 in plate 14.

When properly assembled, the guide stud 21 extends through the guide slot 20 and pivot stud 19 extends through pivot slot 18 as shown in FIGURE 5.

With the two plates 14 and 15 assembled, plate 15 may be moved vertically and rotated through the arc defined by the base of slot 20. The rotating plate may then be locked in position at either end of the arc by lowering the plate 15 in the vertical direction, the pivot stud 19 coming to rest at the bottom of slot 18 in the base plate and the guide stud 21 resting at the top of either arm 22 or 23 in slot 20. Thus it may be seen that rotating plate 15 may be locked in either of two positions by merely raising the plate, rotating to the desired position and lowering the plate.

To provide further and more precise indexing and locking in each position, the adapter plate 15 may be fitted with indexing pins 24 and 25 extending radially from the adapter plate along radius lines passing through pivot stud 19 and arms 22 and 23. In the lowered position, one of the indexing pins 24 and 25 mates with a locking receptacle 26 mounted on base plate 14.

For proper operation of the mechanism, the width of pivot slot 18 should be substantially the diameter of pivot stud 19 and the width of guide slot 20 should be substantially the width of guide stud 21. When the rotating plate 15 is lowered in one of the two alternate positions, indexing pins 25 or 24 mate firmly with the locking receptacle 26. Thus the rotating plate 15 is firmly locked in the desired position and can be moved from one position to the other position simply by moving the plate 15 in the vertical direction for a sufficient distance for the indexing pin to clear the locking receptacle 26 and the guide stud 21 to reach the base of the U-shaped guide slot 20, rotating the plate 15 until guide stud 21 reaches the opposite end of the U-shaped curve 20, and again lowering the plate so that the other indexing pin mates with the locking receptacle 26 and the guide stud 21 rests at the top of the opposite arm of guide slot 20.

The drilling mechanism may be mounted on rotating plate 15 by any suitable means such as bolts or screws fastened through holes 27 in the rotating plate 15. When properly mounted, the drill shaft of the drilling mechanism extends radially from the pivot stud 19 and downwardly along a line passing through pivot stud 19, guide arm 23, and indexing pin 25. Likewise, the tension head 12 is mounted on rotating plate 15 by any suitable means such as bolts or screws fastened through holes 28. The tension head is mounted so that a saw blade drawn therefrom extends along a line pasing radially from pivot stud 19 and passing through guide arm 22 and indexing pin 24. The tension head and drilling means are mounted so that the drill shaft and tension head 12 may be alternately locked in the vertical position in registry with a common point on the work table below the adaptive mechanism. In the preferred embodiment, the angle between the radial lines along which are mounted the tension head and the drill shaft is about 45°. This angle has been found to provide maximum freedom from interference by the portion of the apparatus not in use.

In the preferred embodiment, the drilling mechanism is mounted on a sliding carriage for lowering the drill bit into the work piece when the drilling mechanism is positioned for use. As shown in FIGURES 1 and 2, the drilling mechanism 15 may be comprised of a small electrical motor 30 with a conventional drill chuck 31 affixed to the shaft. The drill motor 30 is mounted on a sliding carriage comprising two parallel rods 32 each journaled in a pair of guides 34. The guides 34 are permanently affixed to the adapter plate 15 as described hereinabove.

The drill mechanism is provided with appropriate means, such as lever 33, for raising and lowering the drill shaft vertically along the radial line extending from the pivot stud 19 through the locking receptacle 26. Thus, when indexing pin 25 is mated with locking receptacle 26, the drill mechanism is locked in a vertical position and the drill bit 35 aligned in registry with a fixed point in the work piece directly below the drill shaft. The drill motor is then manually lowered on the sliding carriage to drill the desired entry hole in the work piece. After the entry hole has been formed the drill motor is withdrawn upwardly. After completion of the drilling operation the rotating plate 15 may be rotated so that the tension head is positioned vertically and aligned in registry with the hole formed by the drilling means. The entry hole thus formed is automatically in registry with the index hole in the work table.

A single lever may be used both to rotate the rotating adapter plate 15 and to raise and lower the drill mechanism 16. The preferred embodiment of the single lever means will be understood from the following description when taken in reference with FIGURES 2, 3, and 5.

As shown in FIGURE 3, the adapter base plate 14 is fitted with a ball socket 38. A lever 33, as shown in FIGURE 2, having a ball on one end thereof, is positioned so that the lever 33 extends through a bushing 37 mounted on the drill carriage 36, passes through hole 39 in the rotating plate 15, and is secured in the ball socket 38 in base plate 14. Bushing 37 is mounted in the drill carriage 36 and fits snugly along the shank of the lever 33 so that the lever may slide through the bushing. The bushing 37 is also allowed to swivel within the carriage 36. With the ball of lever 33 positioned in socket 38 and lever 33 extending through bushing 37, ball and socket 38 acts as the fulcrum point and lever 33 may be used to apply pressure to carriage 36 (and plate 15), thus allowing the single lever 33 to be used to raise and lower the drill motor and also to rotate the plate 15.

Locking means may be incorporated within the slideable carriage structure to secure the drill mechanism in the raised position when the drill is not in use. In the preferred embodiment, the locking means is a positive action lock positioned on the rotating adapter plate 15 and arranged to engage the carriage 36 when the drill motor is in the raised position. Such a lock may be used to insure that the drill mechanism will remain in the raised position while the saw is being used.

While the locking mechanism has been described with particular reference to a positive action lock, it will be understood that other means may be used to secure the drill mechanism in the raised position when not in use. For example, compression springs may be positioned along the parallel rods 32 such that when the drill carriage is lowered the springs are compressed. In this embodiment the compression springs 41 will automatically return the drill carriage to the raised position when no pressure is applied to the lever 33. Other suitable manual or automatic retraction and locking means will be apparent to those skilled in the art.

For convenience of operation the drilling mechanism may be provided with an electrical switch which is automatically activated by lowering the drill mechanism. For example, a conventional microswitch 42 may be attached to the drill carriage 36 so that electrical current passes through the drill motor only when the drill motor is in the lowered position. When such a switch is utilized, the operator may simply swing the drill motor into position using a single lever and raise and lower the drill motor using the same lever. With the microswitch properly positioned, power is supplied to the drill motor only when in actual use by simply lowering the drill carriage into position.

It should be noted that the invention provides another highly advantageous feature which is not found in ordinary jig saws. For example, in the conventional jig saw, when the sawing operation is finished, the saw blade must be released from the reciprocating mechanism below the table and withdrawn from the work piece to allow removal of the work piece from the saw. In the conventional jig saw the tension head 12 applies sufficient tension on the saw blade to withdraw the saw partially from the work piece. However, the lower end of the saw blade 11 ordinarily remains within the work piece, thus necessitating removal of the saw blade from the tension head before the work piece can be removed. Obviously this operation is inconvenient and results in large losses of operator time.

In accordance with the present invention the saw blade need never be removed from the tension head of the jig saw. After completion of the sawing operation the entire tension head is raised vertically as hereinabove described. The vertical movement of the tension head is determined by the length of pivot slot 18 and guide slot 22. When the sawing operation is completed the operator simply removes the lower end of the saw blade 11 from the jaws of the reciprocal means below the work table, and raises the entire rotating plate 15 which carries tension head 12 and drill mechanism 16, vertically for a sufficient distance to withdraw the lower end of saw blade 11 entirely from the work piece. The operator may then rotate the mechanism to bring the drill motor into position for forming a second entry hole. After the second entry hole is formed the mechanism is again rotated and the saw blade 11 lowered into the entry hole and in position to be attached to the reciprocating mechanism. It will thus be apparent that vast savings of operator time may be realized since the invention obviates the necessity for removing the saw blade 11 from the tension head 12 each time a new entry hole is formed.

It will thus be apparent to those skilled in the art that the adaptive mechanism described herein may be added to most conventional jig saws or scroll saws and obtain the features and advantages described. As set forth above, the adaptive plate 14 may be formed with appropriate holes 29 which match the mounting holes on the overarm of any conventional scroll saw. A conventional scroll saw, modified as described herein, may be used to form irregularly shaped holes within the bulk or body of a sheet of material as is done with conventional scroll saws. However, through the use of the drilling mechanism integrally mounted with the tension head of the scroll saw, entry holes may be formed in the work piece and the saw blade inserted directly through the hole without removing the saw blade from the tension head, thus obviating the waste of vast amount of operator time.

While the invention has been described with particular reference to vertically operating scroll saws, it will be apparent to those skilled in the art that the same principles may be used in similar saws which are operated horizontally or at some other angle. Furthermore, it will be recognized by those in the art that the invention is not limited to the precise operations described, but may be used in conjuction with sawing or drilling apparatus other than jig saws such as routers and the like.

It is to be understood that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

What is claimed is:

1. In combination:
   (a) a scroll saw of the type having a tension head mounted on an overarm extending over a work table, said tension head supporting one end of a blade extending from said tension head through said work table, said blade having its other end attached to reciprocal means below said table,
   (b) a rotatable plate pivotally affixed to said overarm, said plate having indexing and locking means for alternatively locking said plate in one of at least two locked positions,
   (c) a tension head mounted on said rotatable plate, and
   (d) drilling means mounted on said rotatable plate.

2. The combination set forth in claim 1 wherein said drilling means is mounted on a slideable carriage comprising a pair of parallel rods each journaled in a pair of housings mounted on said rotatable plate.

3. The combination set forth in claim 2 and further including lever means for consecutively moving said drilling means along said slideable carriage and rotating said rotatable plate between said two locked positions.

4. In an apparatus for cutting sheet materials comprising a substantially vertical ribbonlike blade passing through a work table, a tension head mounted on an overarm above said table and holding one end of said blade, and means attached to the opposite end of said blade for imparting reciprocal motion to said blade mounted below and said table, the improvement comprising:
   (a) a moveable plate upon which are mounted drilling means and said tension head, and
   (b) means for alternatively positioning said tension head and said drilling means vertically above and in registry with a common point on said table.

5. The improvement as set forth in claim 4 wherein said drilling means is mounted on a pair of parallel rods, each of said rods slideably journaled within bushings positioned within a pair of support housings attached to said movable plate.

6. The improvement as set forth in claim 4 wherein said moveable plate is rotatable about a pivot point, and said tension head and the drill shaft of said drilling means are mounted along lines extending radially from said pivot point.

7. The improvement as set forth in claim 6 wherein the angle between said lines at the intersection thereof at the pivot point is about 45°.

8. An adaptive mechanism for alternatively positioning drilling means and a scroll saw tension head vertically above and in registry with the index hole in a scroll saw work table comprising,
(a) a base plate adapted to be mounted on the overarm of said scroll saw and having a pivot slot and a guide stud extending from the face thereof,
(b) an adapter face plate having a guide slot and a pivot stud projecting from the back thereof, said pivot stud mating with said pivot slot, and a U-shaped guide slot spaced from said pivot stud, the base of said U-shaped guide slot traversing an arc of fixed radius from said pivot stud, the sides of said U-shaped guide slot extending along lines extending radially from said pivot stud, said guide stud extending through said U-shaped guide slot,
(c) means for attaching a drill to said adapter face plate, and
(d) means for attaching a scroll saw tension head to said adapter face plate.

9. The adaptive mechanism as set forth in claim 8 and further having indexing pins extending from said adapter face plate, said indexing pins extending along said lines extending radially from said pivot stud, said indexing pins being adapted to alternatively engage a locking receptacle on said base plate.

10. The adaptive mechanism of claim 9 and further including:
(a) a slideable carriage for moving said drill vertically along a line extending radially from said pivot stud and passing through one arm of said U-shaped slot, and
(b) lever means for consecutively moving said drilling means along said slideable carriage and rotating said adapter face plate about said pivot stud.

11. The adaptive mechanism of claim 10 and further including:
(a) an electrical switch mounted on said mechanism for connecting said drill with a source of electrical power, said switch being mounted to allow electric current to flow through the drill motor only when said drill is vertically positioned and lowered to operating position on said slideable carriage, and
(b) locking means for retaining said drill at the top of said slideable carriage when said tension head is positioned for use.

References Cited

UNITED STATES PATENTS

| | | | |
|---|---|---|---|
| 179,907 | 7/1876 | Giroud | 144—35 |
| 855,814 | 6/1907 | Royle | 144—35 |

FOREIGN PATENTS 835,058  3/1952  Germany.

FRANCIS S. HUSAR, Primary Examiner

U.S. Cl. X.R.

144—35